F. B. GIESLER.
APPARATUS FOR TREATING GRAIN AND OTHER MATERIALS.
APPLICATION FILED JULY 25, 1911.

1,025,263.

Patented May 7, 1912.
4 SHEETS—SHEET 1.

F. B. GIESLER.
APPARATUS FOR TREATING GRAIN AND OTHER MATERIALS.
APPLICATION FILED JULY 25, 1911.

1,025,263.

Patented May 7, 1912.
4 SHEETS—SHEET 2.

F. B. GIESLER.
APPARATUS FOR TREATING GRAIN AND OTHER MATERIALS.
APPLICATION FILED JULY 25, 1911.

1,025,263.

Patented May 7, 1912.
4 SHEETS—SHEET 3.

F. B. GIESLER.
APPARATUS FOR TREATING GRAIN AND OTHER MATERIALS.
APPLICATION FILED JULY 25, 1911.
1,025,263.
Patented May 7, 1912.
4 SHEETS—SHEET 4.
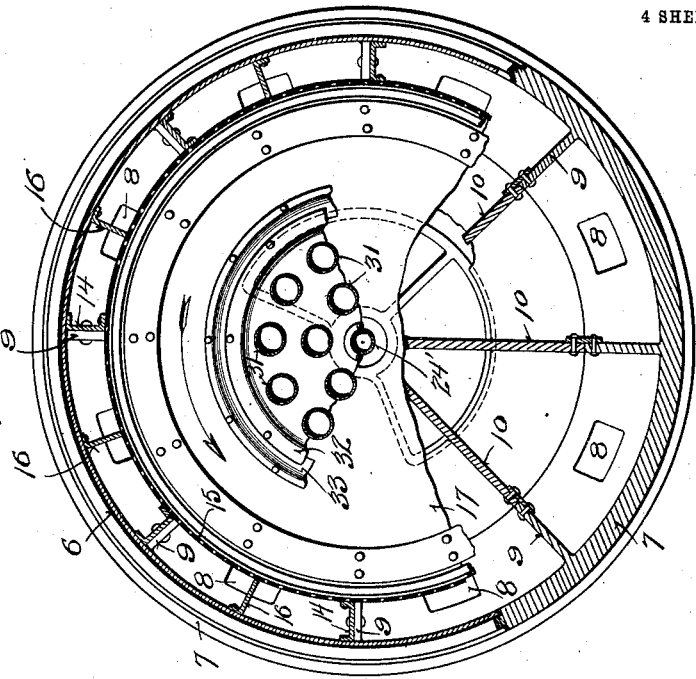
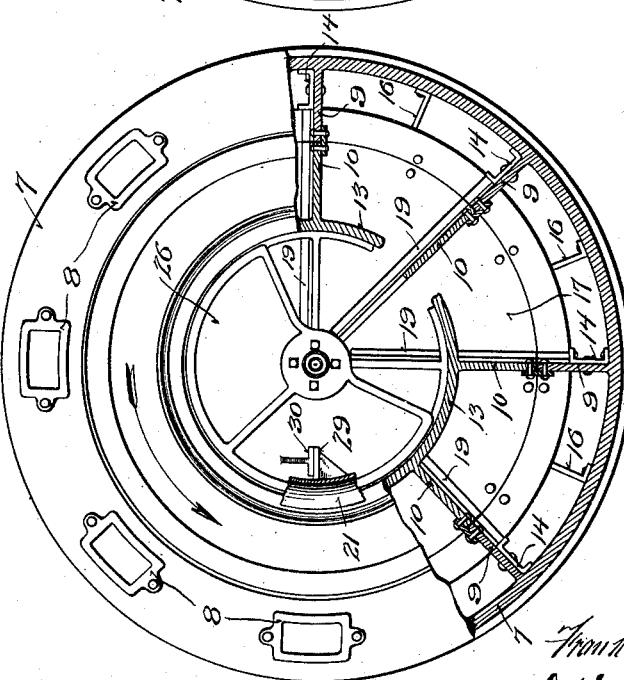

UNITED STATES PATENT OFFICE.

FRANKLIN B. GIESLER, OF MILWAUKEE, WISCONSIN.

APPARATUS FOR TREATING GRAIN AND OTHER MATERIALS.

1,025,263.       Specification of Letters Patent.     Patented May 7, 1912.

Application filed July 25, 1911. Serial No. 640,493.

*To all whom it may concern:*

Be it known that I, FRANKLIN B. GIESLER, a citizen of the United States, and resident of Milwaukee, in the county of Milwaukee and State of Wisconsin, have invented certain new and useful Improvements in Apparatus for Treating Grain and other Materials; and I do hereby declare that the following is a full, clear, and exact description thereof.

My invention consists in what is herein particularly set forth with reference to the accompanying drawings and pointed out in the claims of this specification, its object being to provide simple, economical and efficient apparatus of the rotary pneumatic drum type for the treatment of grain and other material to malt or dry the same.

Figure 1:
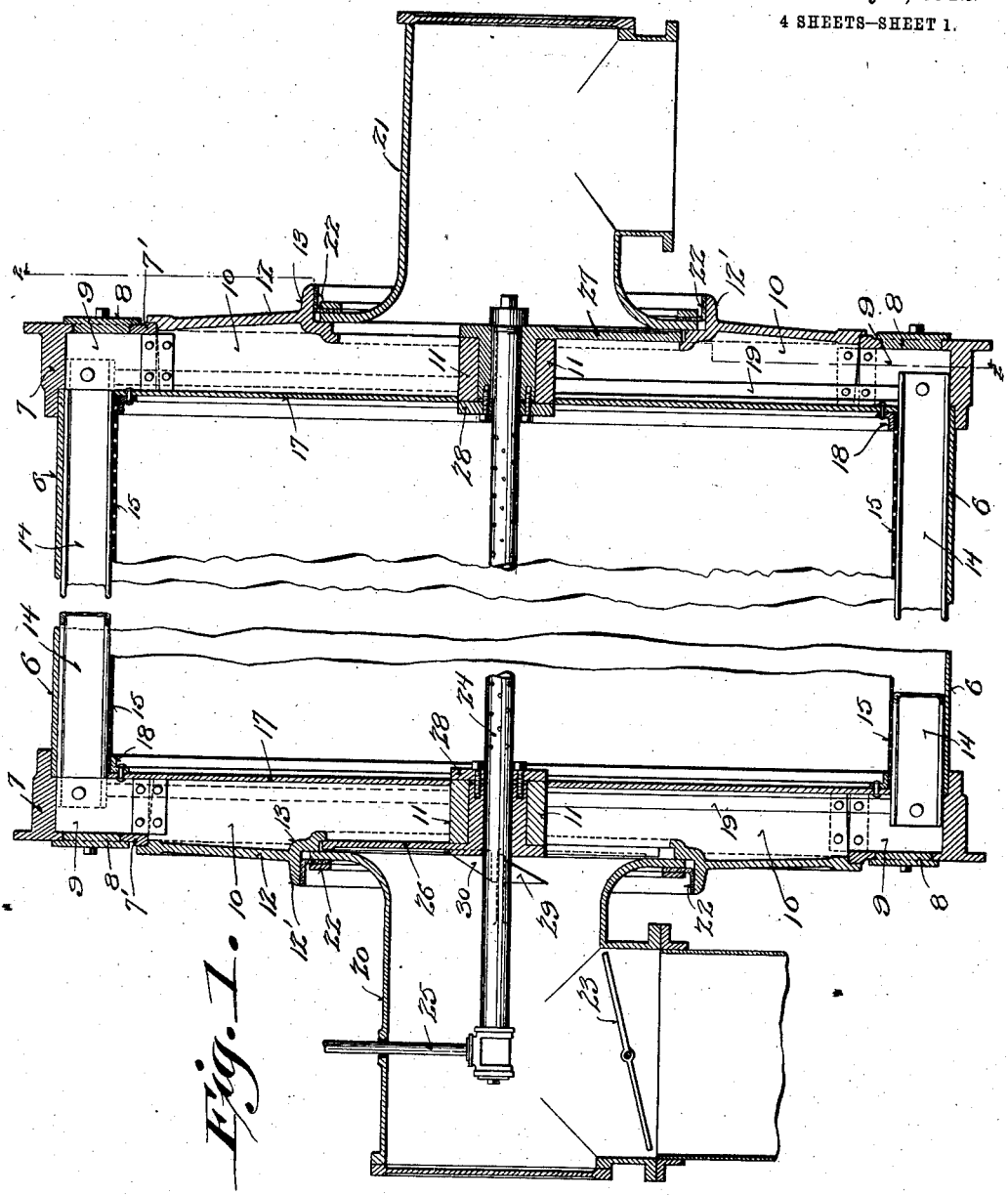
Figure 2:
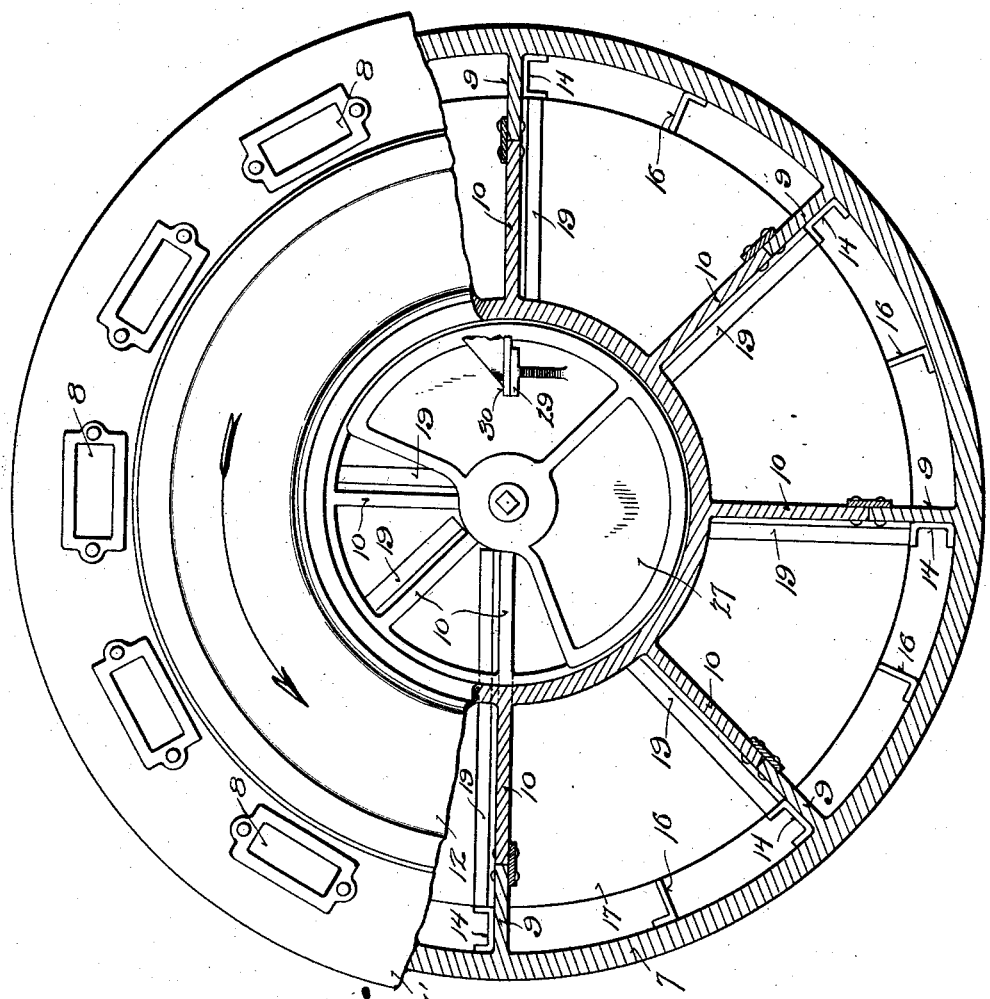
Figure 3:
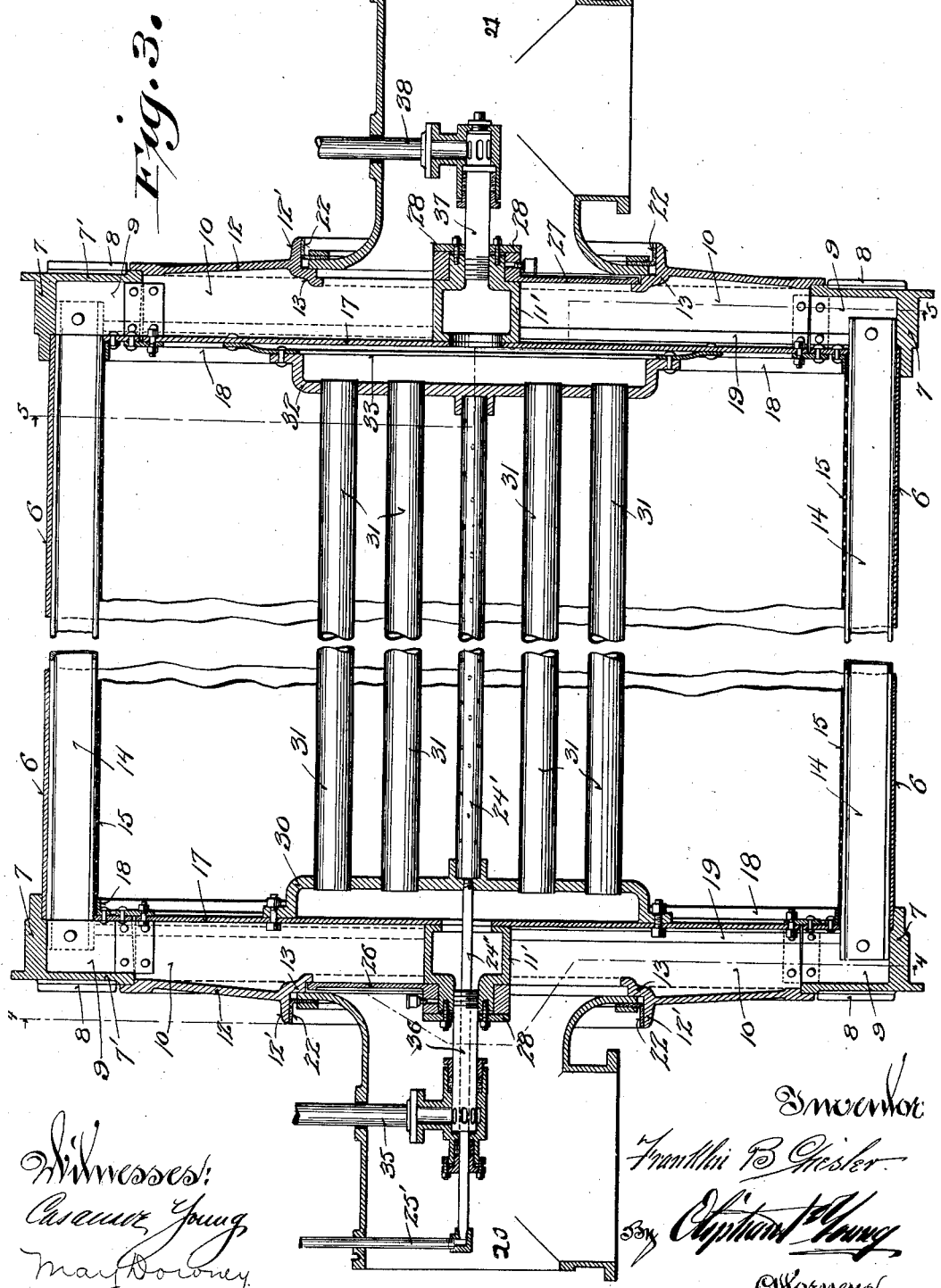

Figure 1 of the drawings represents a central longitudinal section view of a rotary pneumatic malting drum type of grain-treating apparatus in accordance with my invention, parts of the same being broken away; Fig. 2, a transverse section view of the same indicated by line 2—2 in Fig. 1; Fig. 3, a view similar to said Fig. 1, illustrating the drum organized for attemperating and drying the material under treatment, and Figs. 4 and 5 transverse section views respectively indicated by lines 4—4 and 5—5 in Fig. 3.

Referring by numerals to the drawings, 6 indicates an outer non-perforated shell portion of a rotary pneumatic drum and 7 each of a pair of flanged end rings to which said shell is suitably secured. The flanges of the ring are provided with hand-holes at suitable intervals apart, and covers 8 for these holes are bolted to said flanges. Extending inward from each of the rings 7, at regular intervals apart, is a series of radial webs 9, and in fish-joint connection with these webs are registering webs 10 that radiate from the hub 11 of a spider-plate 12 having an annularly flanged and countersunk open portion 13, concentric with said hub, and the perimeter of said plate has lap-joint match-fit upon the flange 7' of the adjacent end-ring 7 to therewith form a head of the aforesaid shell. Bolted to the ring-webs 9 are channel-irons 14 to which plates that go to make up an inner perforated shell 15 of the drum are riveted or otherwise suitably secured, and braces 16 for said shell are likewise fastened to the end rings of the drum. The shell 15 and non-perforated heads 17 of the same are connected by angle-iron rings 18 to which they are suitably fastened, and angle-iron stays 19 are likewise attached to said heads and the webs of the end rings and spider-plates of the drum. From the foregoing it will be understood that a series of longitudinal air spaces are provided at regularly recurring intervals between the two aforesaid shells of the drum, and that the spaces are in communication with a corresponding series of radial air-spaces between the heads of said shells. Engaging countersinks of the spider-plates 12 are flared ends of arms 20 and 21 of air-supply and air-exhaust flues, flexible gaskets 22 being provided in connection with said ends of the flue-arms to oppose the flanges 12' of said plates and thus provide air-tight joints between said flue-arms and the drum. A butterfly check-valve 23 is preferably provided in the arm 20 of the air-inlet flue, and a perforated distributer-pipe 24 extending longitudinally of the drum, central of the same, is connected by a swivel-joint, in said flue-arm, with a feed-pipe 25 for water or steam, the end of said distributer-pipe in the flue-arm 21 being capped or otherwise closed.

Fitting the hubs of the spider-plates 12 within the same, as in Fig. 1, or on the same as in Fig. 3, are hubs of stationary segmental valves 26 and 27, and suitably disposed rings 28 are employed to maintain the engagement of said hubs. The disposition of the valves 26 and 27 is such, that they close an equal amount of air space between the heads of the aforesaid shells, but in opposite directions, the valve 26 at the air-intake end of the drum being for the most part above and the valve 27 for the most part below a line of 45° through the center of said drum, and hence above and below the obliquity of the material under treatment in the drum, there being constant shift of said material incident to the rotation of said drum. To prevent the valves moving with the drum, they are provided with stops 29 in opposition to similar devices 30 provided in the arms 20 and 21 of the flues aforesaid, and as shown in Fig. 3, provision may be had for lubricating the hubs of the spider-plates 12, which hubs turn in or on those of said valves as may be preferable in practice.

The drum as thus far described may be utilized for treating grain or other material when provision for attemperating the same in said drum is unnecessary. The air admitted through the flue-arm 20 finds its way down the open radial air-spaces between the heads of the shells 6, 15 of the drum into the communicating longitudinal spaces of the same, then up through the material in said shell 15 and out through other longitudinal air-spaces into radial air spaces that are open to the exhaust-flue arm 21, moisture being supplied to said material, as may be necessary, through the distributer pipe aforesaid. The material being discharged from the drum, the latter may be cleaned and sterilized by water and steam discharged therein through the aforesaid distributer-pipe, suitable drain-outlets common in the art but not shown being provided.

As best shown in Fig. 3, a dished casting 30 may be bolted to the inner side of one head of the perforated shell of the drum to form a chamber connected by pipes 31 with a similar casting 32 made fast to an expansion and contraction plate 33 secured in connection with the inner side of the other head of said shell to form another chamber, the two chambers being in communication with the then hollow hubs 11' of the aforesaid spider-plates, and a section 24' of a water and steam distributer is connected to the castings 30, 32. A feed-pipe 35, for cold or hot water or steam is in swivel-joint connection with a nozzle 36 fitted to the hub of the spider-plate at the air-intake end of the drum, and a section 24'' of the distributer pipe extends through said joint to have similar joint connection with a feed-pipe 25'. An outlet nozzle 37 fitted to the hollow hub of the spider plate at the exhaust-end of the drum has swivel-joint connection, in the flue-arm 21, with a waste-water pipe 38. Cold or hot water is run through the circulating system above specified to attemperate material under treatment in the drum, and steam run through the same system will serve to create a drying heat in said drum that rotates in the direction of the arrows in Figs. 2, 4 and 5.

The drum is cradled and driven by mechanism not shown, but common in the art of rotary pneumatic malting drums and rotary steam driers.

I claim:

1. In a rotary pneumatic drum type of apparatus for treatment of grain and other material, the combination of an inclosing shell having partly open heads, an inner perforated shell having closed heads, means by which communicating longitudinal and radial air spaces are established between the shells and their heads, stationary air-supply and air-exhaust flues in communication with said radial air-spaces at opposite ends of the drum, and stationary valves controlling the area of opening of said radial air-spaces to said flues, the disposition of said valves being in opposite directions from the line of obliquity of material treated in said drum.

2. In a rotary pneumatic drum type of apparatus for treatment of grain and other material, the combination of an inclosing shell having partly open heads, an inner perforated shell having closed heads, means by which communicating longitudinal and radial air spaces are established between the shells and their heads, stationary air-supply and air-exhaust flues in communication with said radial air-spaces at opposite ends of the drum, stationary valves controlling the area of opening of said radial air-spaces to said flues, the disposition of said valves being in opposite directions from the line of obliquity of material treated in said drum, and means for distributing water and steam within the inner shell.

3. In a rotary pneumatic drum type of apparatus for treatment of grain and other material, the combination of an inclosing shell having partly open heads, an inner perforated shell having closed heads, means by which communicating longitudinal and radial air spaces are established between the shells and their heads, stationary air-supply and air-exhaust flues in communication with said radial air-spaces at opposite ends of the drum, stationary valves controlling the area of opening of said radial air-spaces to said flues, the disposition of said valves being in opposite directions from the line of obliquity of material treated in said drum, and a circulating system for cold or hot water or steam partly within the inner shell.

4. In a rotary pneumatic drum type of apparatus for treatment of grain and other material, the combination of an inclosing shell having partly open heads, an inner perforated shell having closed heads, means by which communicating longitudinal and radial air spaces are established between the shells and their heads, stationary air-supply and air-exhaust flues in communication with said radial air-spaces at opposite ends of the drum, stationary valves controlling the area of opening of said radial air-spaces to said flues, the disposition of said valves being in opposite directions from the line of obliquity of material treated in said drum, means for distributing water and steam within the inner shell, and a circulating system for cold or hot water or steam partly within said inner shell.

5. In a rotary pneumatic malting drum type of apparatus for treatment of grain and other material, the combination of a cylindrical inclosing shell having inwardly extending outer flanges and similarly extending inner webs at regularly recurring intervals, together with spider-plate head portions matching said flanges and having hubs from which radiate webs in connection with those of said rings, said plates being provided with openings concentric to their hubs; channel-irons longitudinally of the shell and connected at their ends to the head-ring webs of the same, an inner perforated cylindrical shell attached to the channel-irons and having non-perforated heads against the connected webs aforesaid, stationary air-supply and air-exhaust flues engaging the openings in the spider-plates, and stationary segmental valves in said plate-openings, the disposition of these valves being in opposite directions from the line of obliquity of material treated in the drum.

6. In a rotary pneumatic malting drum type of apparatus for treatment of grain and other material, the combination of a cylindrical inclosing shell having inwardly extending outer flanges and similarly extending inner webs at regularly recurring intervals, together with spider-plate head portions matching said flanges and having hubs from which radiate webs in connection with those of said rings, said plates being provided with openings concentric to their hubs; channel-irons longitudinally of the shell and connected at their ends to the head-ring webs of the same, an inner perforated cylindrical shell attached to the channel-irons and having non-perforated heads against the connected webs aforesaid, inner shell braces in connection with said head-rings intermediate of the webs thereof, stationary air-supply and air-exhaust flues engaging the openings in the spider-plates, and stationary segmental valves in said plate-openings, the disposition of these valves being in opposite directions from the line of obliquity of material treated in the drum.

7. In a rotary pneumatic drum type of apparatus for treatment of grain and other material, the combination of an inclosing shell having inwardly extending outer flanges provided with normally closed hand-holes, similarly extending radial webs at regularly recurring intervals of the rings, spider-plate head portions matching said flanges and of themselves provided with hubs from which radiate webs in connection with those of said rings, said plates being provided with openings concentric to their hubs; channel-irons longitudinally of the shell and connected at their ends to the head-ring webs of the same, an inner perforated cylindrical shell attached to the channel-irons and having non-perforated heads against the connected webs aforesaid, stationary air-supply and air-exhaust flues engaging the openings in the spider-plates, and stationary segmental valves in said plate-openings, the disposition of these valves being in opposite directions from the line of obliquity of material treated in the drum.

8. In a rotary pneumatic malting drum type of apparatus for treatment of grain and other material, the combination of a cylindrical inclosing shell having inwardly extending outer flanges and similarly extending inner webs at regularly recurring intervals, together with spider-plate head portions matching said flanges and having hubs from which radiate webs in connection with those of said rings, said plates being provided with openings concentric to their hubs; channel-irons longitudinally of the shell and connected at their ends to the head-ring webs of the same, an inner perforated cylindrical shell attached to the channel-irons and having non-perforated heads against the connected webs aforesaid, radially disposed braces for the shell-heads, stationary air-supply and air-exhaust flues engaging the openings in the spider-plates, and stationary segmental valves in said plate-openings, the disposition of these valves being in opposite directions from the line of obliquity of material treated in the drum.

9. In a rotary pnuematic drum type of apparatus for treatment of grain and other material, the combination of the material receptacle of the drum having a head thereof provided with a contraction and expansion plate, a dished casting in connection with the plate, a similar casting in connection with the other head of the receptacle, pipes connecting the castings, a water and steam conduit leading to a chamber formed in part by one of the castings, and a similar conduit leading from a chamber formed in part by the other of said castings.

In testimony that I claim the foregoing I have hereunto set my hand at Milwaukee in the county of Milwaukee and State of Wisconsin in the presence of two witnesses.

FRANKLIN B. GIESLER.

Witnesses:
 N. E. OLIPHANT,
 MAY DOWNEY.

---

Copies of this patent may be obtained for five cents each, by addressing the "Commissioner of Patents, Washington, D. C."